United States Patent
Kawasome (10) Patent No.: US 7,148,876 B2
(45) Date of Patent: *Dec. 12, 2006

(54) INPUT SYSTEM, PROGRAM, AND RECORDING MEDIUM

(75) Inventor: Toshiki Kawasome, Saitama-ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 400 days.

This patent is subject to a terminal disclaimer.

(21) Appl. No.: 10/266,924

(22) Filed: Oct. 9, 2002

(65) Prior Publication Data

US 2003/0080940 A1 May 1, 2003

(30) Foreign Application Priority Data

Oct. 10, 2001 (JP) .............................. 2001-312468

(51) Int. Cl.
*G09G 5/00* (2006.01)

(52) U.S. Cl. ...................... 345/156; 345/179; 345/172; 345/173

(58) Field of Classification Search ........ 345/156–161, 345/788, 798–800, 173, 163, 781, 856, 857, 345/164, 168–172, 179, 89, 94, 101; 178/18.01, 178/18.03; 235/151.1, 462; 382/188; 340/172.5; 112/102.5; 710/16; 715/768, 863
See application file for complete search history.

(56) References Cited

U.S. PATENT DOCUMENTS

| | | | | |
|---|---|---|---|---|
| 3,723,974 A | * | 3/1973 | Holtz ........................... 710/15 |
| 3,867,616 A | * | 2/1975 | Korelitz et al. ................. 703/1 |
| 5,073,771 A | * | 12/1991 | Satta et al. .................. 345/667 |
| 5,194,852 A | * | 3/1993 | More et al. .................. 345/182 |
| 5,243,149 A | * | 9/1993 | Comerford et al. ....... 178/18.03 |
| 5,250,937 A | * | 10/1993 | Kikuo et al. ................... 345/89 |
| 5,300,927 A | * | 4/1994 | Arai et al. ................... 345/157 |
| 5,474,000 A | * | 12/1995 | Mizuno et al. ........... 112/102.5 |
| 5,798,752 A | * | 8/1998 | Buxton et al. ............... 715/863 |
| 5,877,750 A | * | 3/1999 | Hanson ...................... 345/173 |
| 5,895,906 A | * | 4/1999 | Danielson et al. ...... 235/462.45 |
| 5,982,352 A | * | 11/1999 | Pryor .......................... 345/156 |
| 6,204,837 B1 | * | 3/2001 | Smith .......................... 345/157 |
| 6,229,526 B1 | * | 5/2001 | Berstis ........................ 345/158 |
| 6,333,753 B1 | * | 12/2001 | Hinckley ..................... 715/768 |
| 6,377,240 B1 | * | 4/2002 | Baudel et al. ............... 345/157 |
| 6,473,073 B1 | * | 10/2002 | Fleck .......................... 345/173 |
| 6,545,663 B1 | * | 4/2003 | Arbter et al. ................ 345/158 |
| 6,597,383 B1 | * | 7/2003 | Saito ........................... 345/860 |
| 6,628,267 B1 | * | 9/2003 | Karidis et al. ............... 345/168 |
| 6,674,425 B1 | * | 1/2004 | Louis et al. ................. 345/173 |
| 6,677,927 B1 | * | 1/2004 | Bruck et al. ................ 345/156 |
| 6,681,268 B1 | * | 1/2004 | Kikuchi et al. ................ 710/16 |
| 6,983,336 B1 | * | 1/2006 | Kikuchi et al. ................ 710/16 |
| 2002/0024499 A1 | * | 2/2002 | Karidis et al. .............. 345/156 |
| 2002/0030665 A1 | * | 3/2002 | Ano | |
| 2002/0080126 A1 | * | 6/2002 | Keely et al. ................. 345/179 |
| 2002/0109671 A1 | * | 8/2002 | Kawasome | |
| 2004/0140965 A1 | * | 7/2004 | Wang et al. ................. 345/179 |
| 2005/0111736 A1 | * | 5/2005 | Hullender et al. .......... 382/188 |

* cited by examiner

*Primary Examiner*—Bipin Shalwala
*Assistant Examiner*—Prabodh Dharia
(74) *Attorney, Agent, or Firm*—Berenato, White & Stavish (57) ABSTRACT

An input system comprising a computer operably associated with a display screen, a first input device, and a second input device. The first input device has an operating region corresponding to an operation region displayed on the display screen. The operation region may be enlarged, reduced, or moved in response to an operation of the second input device.

9 Claims, 11 Drawing Sheets

| DISPLAY REGION | BASE POINT COORDINATES | INPUT RANGE |
|---|---|---|
| 1024*768 | (150,200) | 600*400 |

INPUT RANGE INFORMATION — 241
- 241A: DISPLAY REGION
- 241B: BASE POINT COORDINATES
- 241C: INPUT RANGE

FIG. 4

INPUT RANGE CHANGING TABLE /242

| 242A OPERATION TYPE | 242B CORRESPONDING PROCESSING | 242C PROCESSING PARAMETERS |
|---|---|---|
| WHEEL (+) | ENLARGE | INPUT RANGE: X = +1 pix, Y = +1 pix |
| WHEEL (-) | REDUCE | INPUT RANGE: X = -1 pix, Y = -1 pix |
| BALL (HORIZONTAL +) | MOVE | BASE POINT COORDINATE: X = +1 PIX |
| BALL (HORIZONTAL -) | MOVE | BASE POINT COORDINATE: X = -1 PIX |
| BALL (VERTICAL +) | MOVE | BASE POINT COORDINATE: Y = +1 PIX |
| BALL (VERTICAL -) | MOVE | BASE POINT COORDINATE: Y = -1 PIX |
| KEY 1 | SWITCH TO RANGE 1 | BASE POINT COORDINATES (200, 220), INPUT RANGE 640 x 480 |
| KEY 2 | SWITCH TO RANGE 2 | BASE POINT COORDINATES (100, 100), INPUT RANGE 800 x 600 |
| KEY 3 | FULL-SCREEN | BASE POINT COORDINATES (0, 0), INPUT RANGE = DISPLAY REGION |

INPUT RANGE CHANGING TABLE — 243

| 243A OPERATION TYPE | 243B CORRESPONDING PROCESSING | 243C PROCESSING PARAMETERS |
|---|---|---|
| → | MOVE | BASE POINT COORDINATE: X = +1 PIX |
| ↓ | MOVE | BASE POINT COORDINATE: Y = +1 PIX |
| ← | MOVE | BASE POINT COORDINATE: X = −1 PIX |
| ↑ | MOVE | BASE POINT COORDINATE: Y = −1 PIX |
| Ctrl + → | ENLARGE | INPUT RANGE: X = +1 pix, Y = +1 pix |
| Ctrl + ← | REDUCE | INPUT RANGE: X = −1 pix, Y = −1 pix |
| Ctrl + A | FULL-SCREEN | BASE POINT COORDINATES (0, 0), INPUT RANGE = DISPLAY REGION |
| Ctrl + 1 | SWITCH TO RANGE 1 | BASE POINT COORDINATES (200, 220), INPUT RANGE 640 × 480 |
| Ctrl + 2 | SWITCH TO RANGE 2 | BASE POINT COORDINATES (100, 100), INPUT RANGE 800 × 600 |

INPUT SYSTEM, PROGRAM, AND RECORDING MEDIUM

CLAIM TO PRIORITY

Applicant hereby claims priority under 35 U.S.C. § 119 to Japanese Application No. 2001-312468, filed Oct. 10, 2001, titled Input System, Program, And Recording Medium, the disclosure of which is incorporated herein by reference.

FIELD OF THE INVENTION

The present invention relates to an input system comprising a computer operably associated with a first input device, a second input device differing from the first input device, and a display having a display screen. The first input device has an operating region corresponding to an operation region on the display screen. The size and position of the operation region on the display screen may be enlarged, reduced, moved, or otherwise modified using the second input device. The invention also relates to a program for controlling the input system, and to a recording medium for storing the program.

BACKGROUND OF THE INVENTION

A mouse, trackball, and digitizer having a stylus are conventionally known pointing devices. As known in the art, a digitizer detects the position of an operably associated input device, such as a stylus, in an operating region provided on the digitizer. The digitizer generates input signals corresponding to the detected position, which are output to an operably associated computer. Various designs for digitizers and styluses, as well as detection means, are well known in the art, such as those disclosed in U.S. Pat. No. 5,977,959 to Katsurahira et al., U.S. Pat. No. 6,259,438 to Fleck et al., U.S. Pat. No. 5,969,296 to Yamamoto et al., and U.S. Pat. No. 5,134,689 to Murakami et al., the disclosures of which are incorporated herein by reference. The computer may be pre-set to include a region on the display that corresponds to the operating region of the digitizer. The computer receives the signals from the digitizer, which are interpreted as operations on the display region.

Therefore, the position of the stylus on an operating region of the digitizer corresponds to a set operation in a display operation region. Accordingly, the digitizer and stylus have excellent sense-of-operation unmatched by other pointing devices. It is therefore a desirable input device, capable of intuitive input operations that are easily performed by a user.

However, the position and size of the display operation region corresponding to the operating region on the digitizer is pre-set to particular settings. These settings must be changed in order to perform operations with the digitizer and stylus in regions other than the pre-set display operation region.

Figure 14:
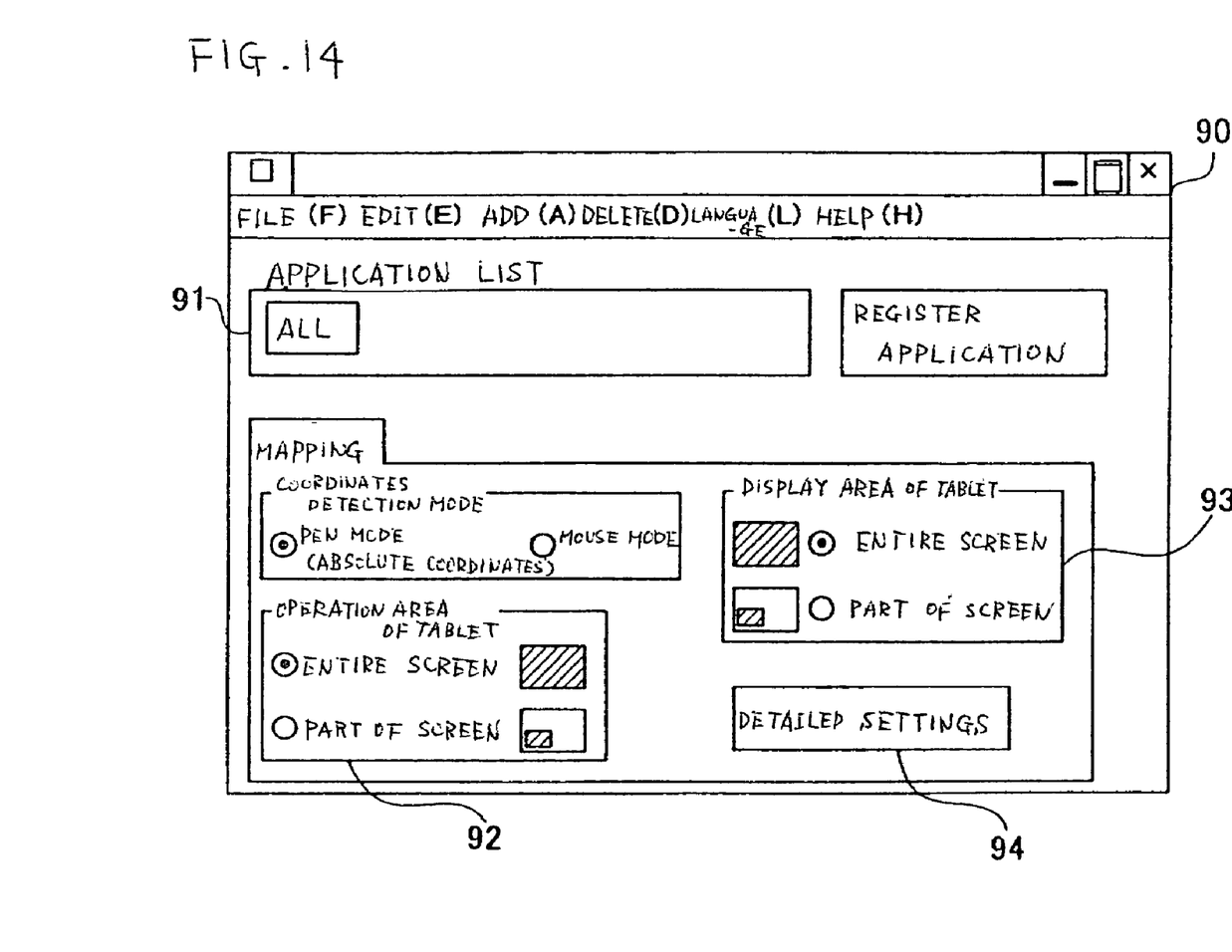
FIG. 14 is an elevational view of a settings screen 90 according to the present invention.

For example, as best shown in FIG. 14, a settings screen 90 includes an application list display portion 91, which displays a list of application programs to be operated using the digitizer and stylus. Particular settings are pre-set so that the digitizer and stylus are used for all application programs executed by the computer, as shown in FIG. 14. An operating area settings portion 92 is pre-set by a radio button or the like, and determines whether or not all of the operating region on the digitizer will be used at the time of operating the application programs displayed in the application list display portion 91.

Figure 15:
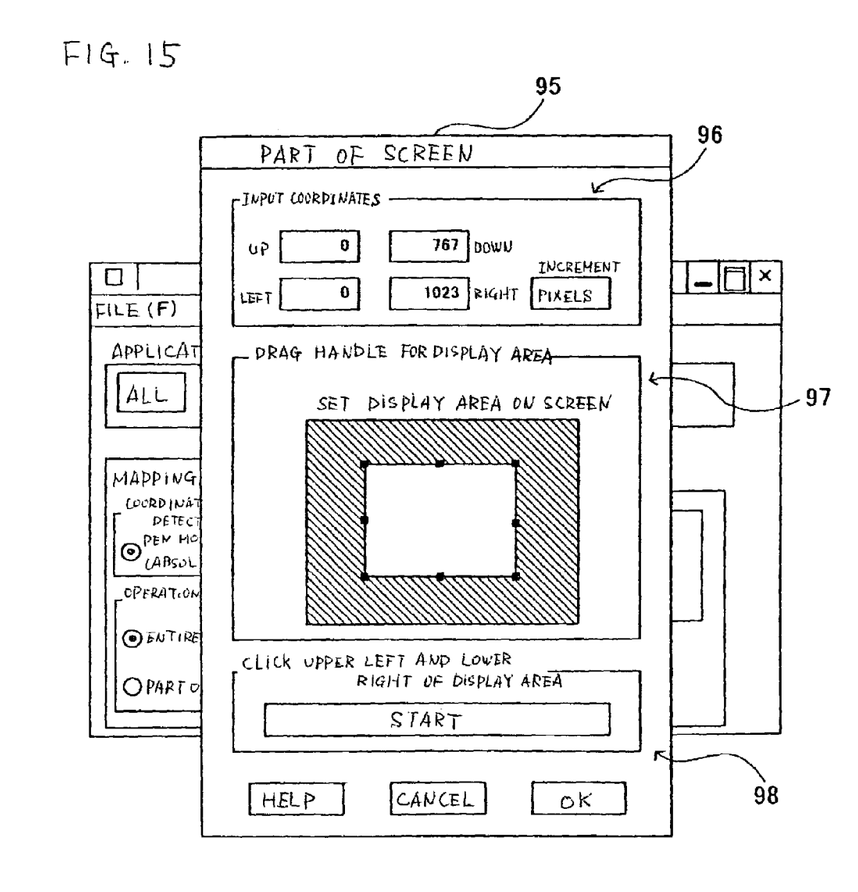
FIG. 15 is an elevational view of a detailed settings screen 95 according to the present invention.

Furthermore, a display area settings portion 93 of the settings screen 90 is pre-set, and defines the size and position of the display operation region. If a portion of the display corresponds to the operating region on the digitizer, detailed settings are provided by operating a detailed settings button 94. Operation of the detailed settings button 94 brings up a pop-up window on the settings screen 90, which is a detailed settings screen 95, as best shown in FIG. 15. Detailed settings screen 95 includes a coordinates input setting portion 96, a dragging operation setting portion 97, a clicking operation setting portion 98, and so forth.

In the coordinates input setting portion 96, the display operation region may be positioned by setting coordinates on the display. In the dragging operation setting portion 97, the position and size of the display operation region may be adjusted. In the clicking operating setting portion 98, a rectangular region having two points as upper left and lower right corners, relative to the display, may be set to define the display operation region on the display.

Conventionally, the position and size of the display operation region corresponds to the operating region on the digitizer, which is predetermined by settings on the settings screen 90. In order to change the position or size of the display operation region, a user is required to change the settings on the settings screen 90, which is difficult and troublesome for the user. Therefore, there is a need for a method and program for easily adjusting such settings.

SUMMARY OF THE INVENTION

Accordingly, it is an object of the present invention to improve the ease and freedom for adjusting the size and position of the display operation region using a digitizer having an input device such as a stylus.

An input system according to a first embodiment of the present invention comprises: a first input device 7 having a finite operating region 71, which corresponds to a display operation region 303 positioned on a display screen 301; a second input device 6 for performing input operations different from input operations performed by the first input device; and an input control device 2 for receiving and processing input operations that change the positioning state of the display operation region according to input operations by the second input device.

The second input device may be integrally configured with the first input device. In the alternative, the first and second input devices may be configured as a single input device, wherein the single input device functions as both the first input device and the second input device.

In an input system according to a first embodiment, input operations are performed with a first input device having a finite operating region that corresponds to the display operation region. Input operations differing from the input operations performed with the first input device are performed with a second input device by changing the display state of the display operation region on the display screen. For example, the display operation region may be enlarged, reduced, moved, etc., using the second input device. The display operation region may be altered using the second input device while continuing to perform operations with the first input device.

The second input device communicates with an input control device, which alters the display operation region in response to input operations from the second input device. The display operation region may be readily moved to any desired direction on the display screen, and/or the size of the display operation region may be easily modified.

In addition, the input control device, through input operations using the second input device, may also change the position of the display operation region to one of a plurality of pre-set positions on the display screen. The pre-set positions may be situated anywhere on the display screen. Therefore, pre-set optimal positions and sizes for the display operation region provide simple and quick adjustment to the display operation region.

According to a second embodiment of the present invention, a computer program causes a computer 2 to perform operations in a display operation region 303 on a display screen 301 of an operably associated display. The computer is also operably associated with a first input device 7 having a finite operating region 71 that corresponds to the display operation region 303. The display operation region 303 also corresponds to a second input device 6. The second input device 6 performs input operations different from input operations performed by the first input device. In response to input operations from the second input device 6, the computer 2 executes input control processing for changing the positioning state of the display operation region on the display screen. In this way, the display operation region may be manipulated and adjusted using the second input device, while using the first input device for other operations.

Specifically, the program causes the computer to move the display operation region, corresponding to the operating region of the first input device, in a desired direction on the display screen in response to an operation from the second input device. The program also causes the display operation region to be enlarged or reduced, or the position to be changed, in response to input operations from the second input device. The program also causes the display operation region to be changed to one of a plurality of pre-set positions on the display screen in response to input operations by the second input device.

According to a third embodiment of the present invention, a recording medium is provided that stores the above-described program of the second embodiment.

DETAILED DESCRIPTION OF THE INVENTION

First Embodiment

Figure 1:
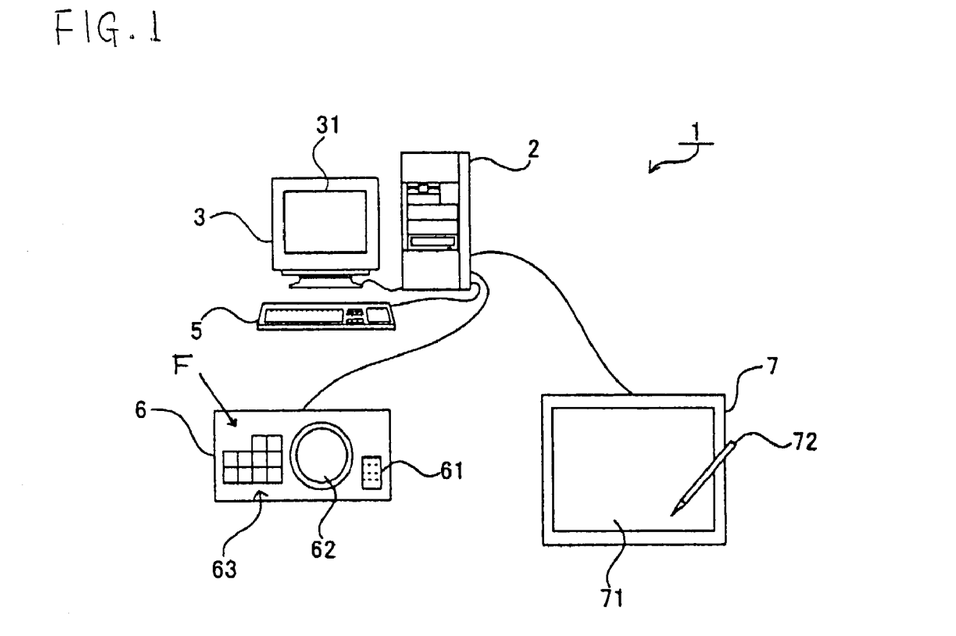
FIG. 1 is a schematic diagram of an input system according to a first embodiment of the present invention.

As best shown in FIG. 1, input system 1 according to a first embodiment comprises a computer 2 operably associated with a display 3, a keyboard 5, a digitizer 7, and an input device 6. Keyboard 5, input device 6, and digitizer or graphics tablet 7 are each connected to computer 2 by a serial interface, such as USB (Universal Serial Bus) or RC-232C, an interface conforming to standards such as PS/2, or some other similar interface.

Display 3 has a display screen 31, such as a CRT (Cathode Ray tube) or LCD (Liquid Crystal Display), and performs various types of display output in response to display information output from computer 2. Display 3 is connected to computer 2 via an interface conforming to standards such as D-Sub, BNC, DVI, DFP, etc. Output signals from computer 2 to display 3 may be either analog signals or digital signals.

Keyboard 5 may have multiple key switches, as known in the art. For example, keyboard 5 may include numeral keys 1 through 0, character or symbol keys, arrow keys "→", "←", "↑", "↓", the escape key "Esc", the alternate key "alt", the control key "Ctrl", or any other such function keys as known in the art. When a user depresses one of the key switches, an operation signal is generated corresponding to the depressed key, and the signal is output to computer 2, which then causes a corresponding function as known in the art.

Input device 6 comprises an input wheel 61, an input ball 62, and a key input portion 63. Input wheel 61 is a ring-shaped wheel vertically rotatable relative to a front face F of input device 6, as best shown in FIG. 1. Input device 6 has a rotation detecting unit (not shown) for detecting rotation of input wheel 61. Input device 6 generates operating signals indicating the direction of rotation of input wheel 61, detected by the rotation detecting unit when input wheel 61 is rotated a certain amount by the user. The operating signals are then output to computer 2.

Input ball 62 is a ball embedded into front face F of input device 6, and is rotatable in any desired direction relative to front face F. Input device 6 further comprises a rotation detecting unit (not shown) for detecting the direction and amount of rotation of input ball 62. Input device 6 generates an operating signal corresponding to the direction of rotation of input ball 62, which is detected by the rotation detecting unit when input ball 62 is rotated a certain amount by the user, and outputs the signals to computer 2.

The rotation detecting unit for input ball 62 may be any known component for detecting the amount of rotation of input ball 62 in the horizontal and vertical directions, such as a rotary encoder or optical sensor. Therefore, even if input ball 62 is rotated diagonally with respect to front face F of input device 6, the rotation-detecting unit detects the amount of rotation of input ball 62 in correlated vertical and horizontal directions. Operating signals are generated that correspond to the amount of rotation in the vertical direction and the horizontal direction, and are output to computer 2.

Key input portion 63 may comprise multiple key switches, as best shown in FIG. 1. As with keyboard 5, if one of the key switches is depressed, input device 6 generates an operating signal corresponding to the depressed key switch, and outputs the signal to computer 2.

Digitizer 7 is preferably plate-shaped, as best shown in FIG. 1, and includes an operating region 71 and an input stylus 72. Operations may be performed on operating region 71 using stylus 72. Digitizer 7 detects the position of stylus 72 on operating region 71, generates operating signals corresponding to the detected position, and outputs the signals to computer 2. Stylus 72 may further comprise a button, in which case digitizer 7 generates a corresponding operating signal if the button is operated, and outputs the signal to computer 2.

Figure 2:
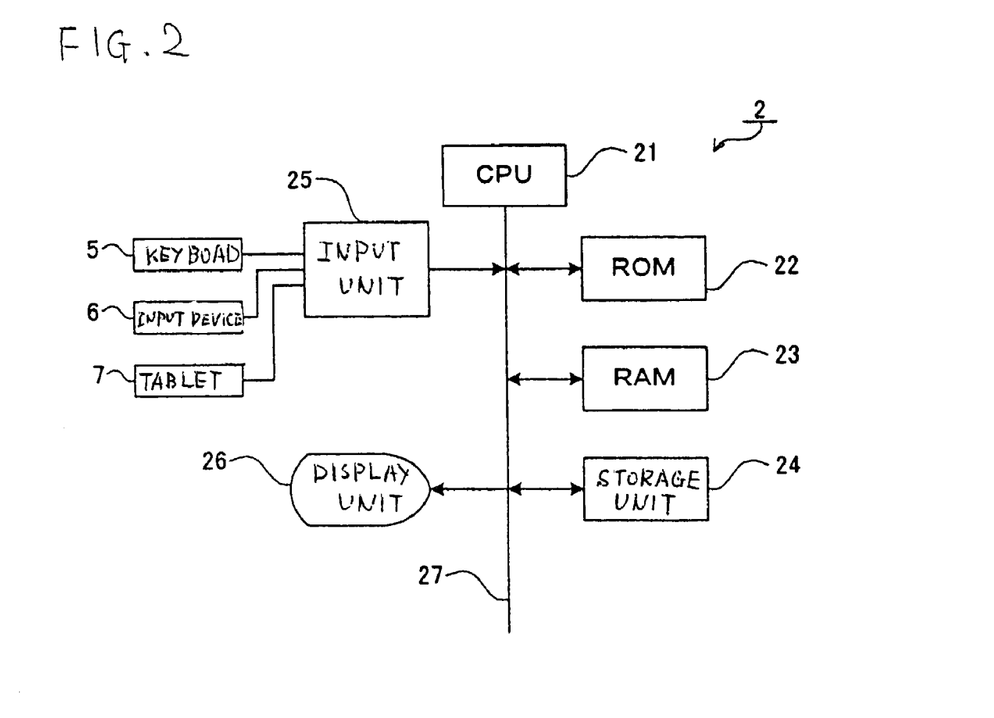
FIG. 2 is a block diagram showing functional components of the computer 2 of FIG. 1.

The functional components of computer 2 are best shown in FIG. 2. Computer 2 comprises a CPU (Central Processing Unit) 21, ROM (Read-Only Memory) 22, RAM (Random Access Memory) 23, a storage unit 24, an input unit 25, and a display unit 26. These components are interconnected by a bus 27.

Keyboard 5, input device 6, and digitizer 7 are all operably associated with input unit 25, and may have the above-mentioned various types of interfaces. Input unit 25 outputs operating signals received from input devices 5, 6 and 7 to CPU 21, along with code indicating the particular device that generated the signal.

Display unit 26 is operably associated with display 3 via an interface conforming to standards such as D-Sub, BNC, DVI, DFP, etc. Display unit 26 generates plotting signals based on the display information input from CPU 21. The plotting signals are then output to display 3, and a corresponding image is displayed on display screen 31 of display 3.

A system program, stored in ROM 22 or storage unit 24, is retrieved by CPU 21 when computer 2 is started. CPU 21 reads the system program in RAM 23, executes the program, and causes the appropriate transition and operating states of the components of computer 2, as well as any associated hardware. Specifically, CPU 21 controls input unit 25 and determines if keyboard 5, input device 6, and/or digitizer 7 are connected to computer 2. CPU 21 reads the device drivers corresponding to input devices 5, 6 and 7 from the device drivers (not shown) stored in storage unit 24, and executes the drivers. CPU 21 then waits for input operations from input devices 5, 6 and/or 7. If input devices 5, 6 or 7 are operated by a user, CPU 21 receives the output signal through the device driver (not shown) being executed, and reads and executes a corresponding application program from storage unit 24 in response thereto.

CPU 21 generates display information for displaying an initial display screen corresponding to the system program being executed, an operating screen for an application program being executed, and any input information from input unit 25, which receives signals from keyboard 5, input device 6 and/or digitizer 7. The display information is output to display unit 26, and displayed on display screen 31 of display 3.

Figure 3:
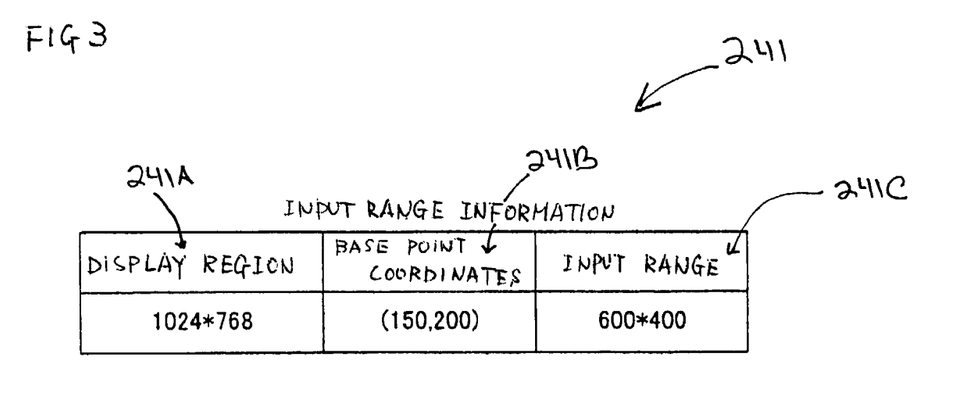
FIG. 3 is a table showing examples of input range information 241 that may be stored in storage unit 24 of FIG. 2.

If operating signals are received from input unit 25, CPU 21 determines if the operating signals are normal operations from digitizer 7. If the operating signals indicate normal operations from digitizer 7, input range information 241, stored in storage unit 24, is retrieved, and input data at the display operation region corresponding to operating region 71 of digitizer 7 is generated based on input range information 241, as best shown in FIG. 3. The input data is then output to the application program being executed.

Figure 4:
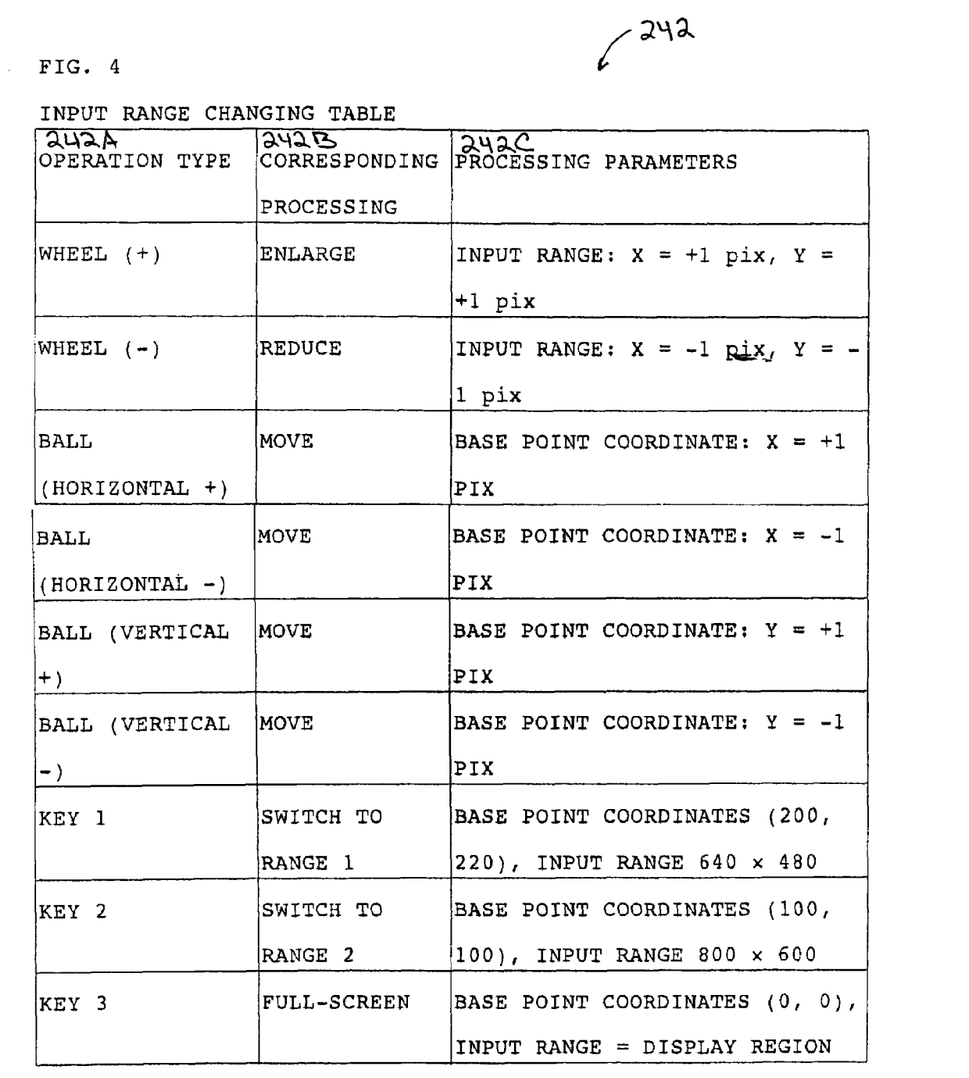
FIG. 4 is a table showing an example of input range changing table 242 that may be stored in storage unit 24 of FIG. 2.

If the operating signals received from input unit 25 are not signals indicating normal operations from digitizer 7, an input range changing table 242, as best shown in FIG. 4, stored in storage unit 24, is retrieved. CPU 21 then updates input range information 241 based on input range changing table 242, and generates new display information which is output to display unit 26, thereby updating the initial display screen displayed on display screen 31.

ROM 22 is a non-volatile semiconductor memory device or the like, and stores system programs which are executed by CPU 21 in a format readable by CPU 21. RAM 23 provides a work area for temporarily holding programs processed by CPU 21, data relating to the programs, and so forth.

Storage unit 24 is a storage device (not shown), such as a magnetic or optical recording medium, a semiconductor memory device, or the like. Storage unit 24 stores various types of programs processed by CPU 21, data relating to the programs, and so forth, in a format readable by CPU 21. The storage recording medium may include detachable media such as CD-ROMs, or fixed media such as hard disks. The storage medium may be mounted to another computer, which is connected to computer 2 via a network and made accessible to CPU 21 via the network. Input range information 241 and input range changing table 242 are stored in storage unit 24. Note that the term "input range" refers to a range of display operation region positioned on the screen, and corresponds to operating region 71 on digitizer 7.

As best shown in FIG. 3, input range information 241 may include information defining the display operation region displayed on display screen 31, such as information defining the position and size of the display operation region.

Preferably, the screen displayed on display screen 31 is controlled by a coordinates system in increments of pixels. The coordinates system has an originating point at an upper left corner of the screen. Moving horizontally toward the right, relative to the originating point, is a positive direction of the X axis. Moving vertically downward, relative to the originating point, is a positive direction of the Y axis. This directional system is known as a physical coordinates system or a screen coordinates system.

Input range information 241 includes the following information: display region 241A, base point coordinates 241B, and input coordinates 241C. The number of pixels in the X axis direction and the Y axis direction are set in display region 241A, which defines the size of the display operation region displayed in display screen 31. For example, the display operation region shown in FIG. 3 is set as 1024 pixels in the horizontal (X-axis) direction and 768 pixels in the vertical (Y-axis) direction.

The position of the point of origin of the display operation region on the display screen is set in base point coordinates 241B. The point of origin of the display operation region is defined as the pixel located at the upper left corner of the display operation region. As shown in FIG. 3, base point coordinates 241B are set at coordinates (150, 200).

The number of pixels in the X axis direction and the Y axis direction of the display operation region are set in the input coordinates 241C, which specifies the size of the display operation region. As shown in FIG. 3, the input coordinates 241C is 600 pixels in the horizontal (X axis) direction and 400 pixels in the vertical (Y axis) direction. Therefore, input range information 241 defines the position and size of the display operation region.

As best shown in FIG. 4, input range changing table 242 includes information for changing the settings of the display operation region, as specified in input range information 241. The settings may be changed in response to operation of input device 6.

Input range changing table 242 includes the following information: operation type 242A, corresponding processing 242B, and processing parameters 242C. Various operations may be performed with input device 6 that are correlated to input range changing table 242, including for example those operations listed below operation type 242A. Processing in response to an operation of input device 6 is set in corresponding processing 242B. Specific processing parameters of input range information 241 are set in processing parameter 242C.

For example, input wheel 61 may be rotated either in a positive (+) direction or a negative (−) direction. Operations for rotating input wheel 61 in the positive direction are set in operation type 242A of input range changing table 242 as "wheel (+)"; operations for rotating input wheel 61 in the negative direction are set as "wheel (−)". The corresponding function activated by "wheel (+)" and "wheel (−)" is set as "enlarge" and "reduce", respectively, in corresponding processing 242B. In other words, enlarging or reducing the display operation region is actuated in response to rotation of input wheel 61.

The processing parameters 242C corresponding to "wheel (+)" may be set as "input range: X=1 pix, Y=1 pix", whereby "pix" is an abbreviation for pixel. Processing for increasing input coordinates 241C of input range information 241 by one pixel in the X-axis direction and the Y-axis direction is correlated with operating input wheel 61 in the positive direction. Thus, each time input wheel 61 is rotated in the positive direction, the size of the display operation region is enlarged in the X-axis direction by 1 pixel and in the Y-axis direction by 1 pixel.

The processing parameters 242C corresponding to "wheel (−)" may be set as "input range: X=−1 pix, Y=−1 pix". Processing for decreasing input coordinates 241C in input range information 241 by one pixel in the X-axis direction and the Y-axis direction is correlated with operating input wheel 61 in the negative direction. Thus, each time input wheel 61 is rotated in the negative direction, the size of the display operation region is reduced in the X-axis direction by 1 pixel and in the Y-axis direction by 1 pixel. In this way, the display operation region may be enlarged or reduced in response to operation of input wheel 61, according to settings in input range changing table 242.

Input ball 62 may also be rotated in a desired direction. Input device 6 detects the amount of rotation in the horizontal direction and vertical direction, thereby detecting the overall direction of operation of input ball 62. The operation of input ball 62 is detected as four types of operations: the positive and negative directions vertically, and the positive and negative directions horizontally. These four types of operations, "ball (horizontal +)", "ball (horizontal −)", "ball (vertical +)", and "ball (vertical −)", are set as operations in operation type 242A in input range changing table 242. "Move" is set in corresponding processing 242B, which corresponds to the four operation types. That is to say, moving the display operation region may be set to correspond with operations of rotating input ball 62.

The processing parameter 242C corresponds to "ball (horizontal +)", and may be set as "base point coordinate: X=+1 pix". Accordingly, base point coordinates 241B in input range information 241 is changed to values wherein the value in the X-axis direction is increased by 1 pixel by rotating input ball 62 in the horizontal positive direction. The display operation region is thereby moved by one pixel to the right, which is the positive X-axis direction.

In the same way, processing parameter 242C corresponding to "ball (horizontal −)" may be set as "base point coordinate: X=−1 pix". Accordingly, base point coordinates 241B in input range information 241 is changed to a value wherein the value in the X-axis direction is decreased by 1 pixel by rotating input ball 62 in the horizontal negative direction. The display operation region is thereby moved by one pixel to the left, which is the negative X-axis direction.

The processing parameter 242C corresponding to "ball (vertical +)" may be set as "base point coordinate: Y=30 1 pix". Accordingly, base point coordinates 241B in input range information 241 is changed to a value wherein the value in the Y-axis direction is increased by 1 pixel by rotating input ball 62 in the vertical positive direction. The display operation region is moved by one pixel downwards, which is the positive Y-axis direction.

In the same way, the processing parameter 242C corresponding to "ball (vertical −)" may be set as "base point coordinate: Y=−1 pix". Accordingly, base point coordinates 241B in input range information 241 is changed to a value wherein the value in the Y-axis direction is decreased by 1 pixel by rotating input ball 62 in the horizontal negative direction. The display operation region is moved by one pixel upward, 1 pixel in the negative Y-axis direction.

In this way, the settings in input range changing table 242 may alter the position and size of the display operation region, in response to operations of input ball 62. Input range changing table 242 only sets processing parameters for increasing or decreasing the base point coordinates 241B of input range information 241 in the X-axis direction and/or the Y-axis direction. Therefore, if input ball 62 is rotated in a diagonal direction, for example, the amount of rotation is determined by detecting the amount of the vertical direction and horizontal direction. Base point coordinates 241B in the input range information 241 is then moved in the X-axis direction and the Y-axis direction corresponding to the amount of rotation in vertical and horizontal directions. Consequently, movement of the display operation region corresponds to the rotational direction of input ball 62.

Key input portion 63 of input device 6 may have multiple keys. Operation of the keys of key input portion 63 is set in operation type 242A in input range changing table 242. Examples of settings for keys 1, 2 and 3 are shown in FIG. 4. However, it is understood that there may be other additional keys, 4, 5, 6, etc.

The corresponding processing 242B that corresponds to key 1 is set to "switch to range 1". Processing parameters 242C for key 1 may be set as "base point coordinates (200, 220), input range 640×480". When key 1 is operated, base point coordinates 241B of input range information 241 are set to coordinates (200, 220), and the input range 241C is set to 640×480 pixels, regardless of base point coordinates 241B and input range 241C pre-set in input range information 241 beforehand. Thus, the position and size of display operation region may be easily switched to specific processing parameters for "range 1."

Similarly, corresponding processing 242B that corresponds to key 2 may be set to "switch to range 2". Processing parameters 242C may be set as "base point coordinates (100, 100), input range 800×600". Accordingly, when key 2 is operated, base point coordinates 241B in input range information 241 are set to the coordinates (100, 100) and input range 241C is set to 800×600 pixels, regardless of base point coordinates 241B and input range 241C pre-set in input range information 241 beforehand. Thus, key 2 switches the size and position of display operation region to processing parameters for "range 2."

Operation of key 3 is set to "full-screen". Processing parameters 242C are set to "base point coordinates (0, 0), input range=display region." Accordingly, when key 3 of key input portion 63 is operated, base point coordinates 241B of input range information 241 are set to the coordinates (0,0) and the input range 241C is set to the same values as the display area in input range information 241, regardless of base point coordinates 241B and input range 241C pre-set in input range information 241 beforehand. In this way, the position and size of the display operation region equals that of the entire display screen 31. Thus, the position and size of display operation region may be easily switched to a pre-set optimal positions and sizes by operating keys on key input portion 63.

It is understood that the settings of input range changing table 242, as shown in FIG. 4, are only examples. Key input portion 63 may include other additional keys, or other processing parameters corresponding therewith. Likewise, other processing parameters, and/or corresponding processing, may be utilized with input wheel 61 and/or input ball 62. For example, multiple position and size settings for the display operation region may be pre-set and stored in input range changing table 242. Key input portion 63 may also be used to alternately switch between first and second display operation regions.

Figure 5:
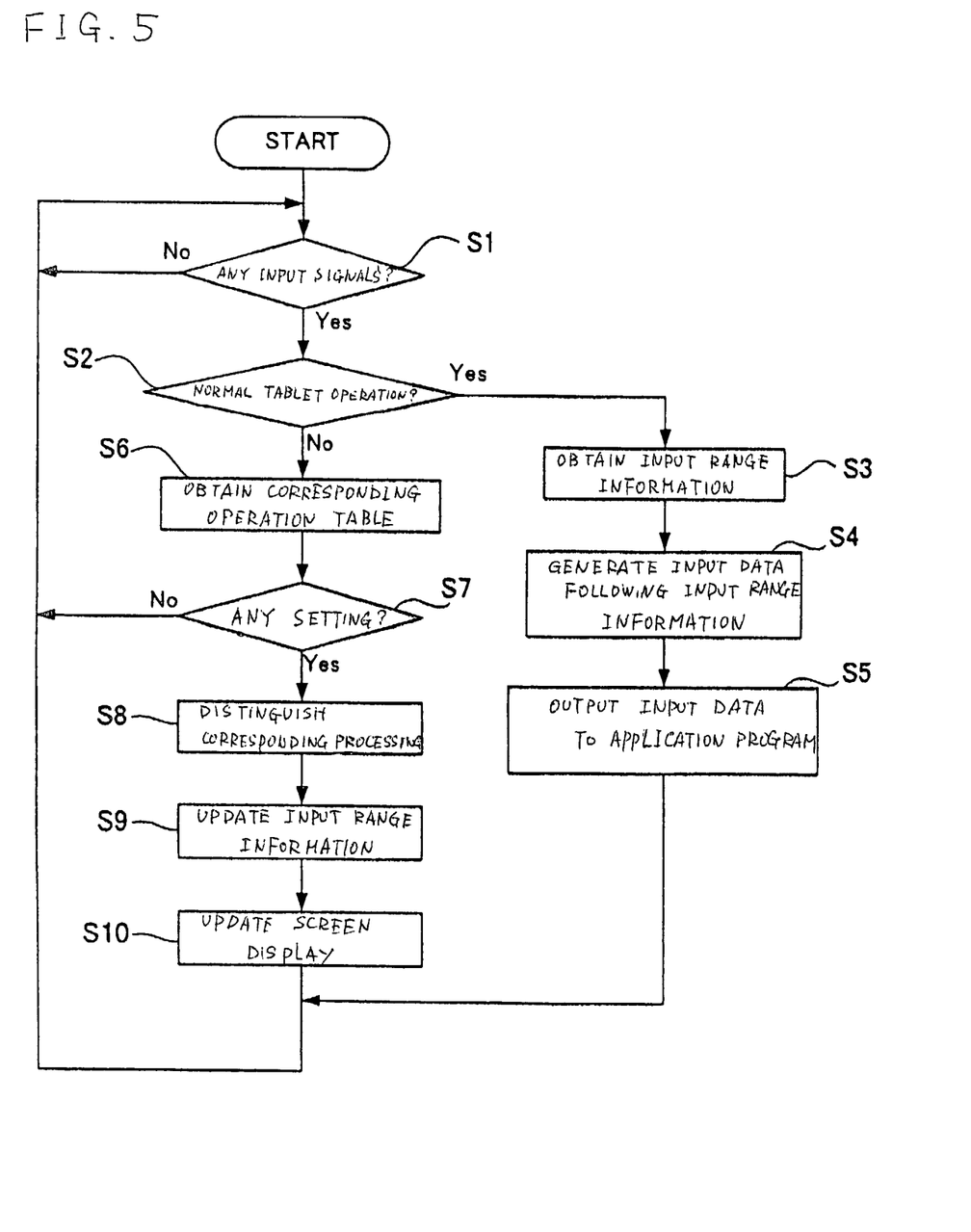
FIG. 5 is a flowchart of a computer process implemented by computer 2 of FIG. 1.

FIG. 5 is a flowchart of the operations of computer 2 according to the first embodiment. CPU 21 is in a standby state for receiving operating signals from input devices 5, 6 and/or 7 at S1. If operating signals are output from keyboard 5, input device 6, or digitizer 7 (YES at S1), CPU 21 determines if the output operating signals indicate normal operations from digitizer 7 at S2.

If the output operating signals indicate normal operations (YES at S2), CPU 21 retrieves input range information 241, which is stored in storage unit 24 at S3. CPU 21 then generates and processes the retrieved input range information 241 at S4. For example, if stylus 72 is detected on operating region 71 of digitizer 7, output signals corresponding to the detected position are communicated to CPU 21. CPU 21 then converts the output signals corresponding to the detected position of stylus 72 to coordinates on the display operation region. Next, CPU 21 outputs the coordinate data generated at S4 to an application program being executed at S5. Processing is then stopped, and the process returns to S1.

If the output operating signals do not indicate normal operations (No at S2), CPU 21 retrieves input range changing table 242 stored in the storage unit 24 at S6. CPU 21 then deciphers the output operating signals, and determines if operations are set in input range changing table 242 at S7.

If the operations are not set in input range changing table 242 in operation type 242A (NO at S7), CPU 21 voids the operation and returns to S1. If the operations are set in input range changing table 242 in operation type 242A (YES at S7), CPU 21 changes the contents of input range information 241 stored in storage unit 24 to the contents set as processing parameters 242C in input range changing table 242, which correspond to operation type 242A identified. Then, the contents are again stored in storage unit 24 at S9.

Display screen 31 of display 3 is updated pursuant to input range information 241 at S10, which has been updated according to input range changing table 242 at S9. Processing is stopped, and the process returns to S1. Processing steps S3 through S5 may be executed with a driver program. Processing steps S1, S2, and S6 through S1 may be executed with a resident program.

Figure 6:
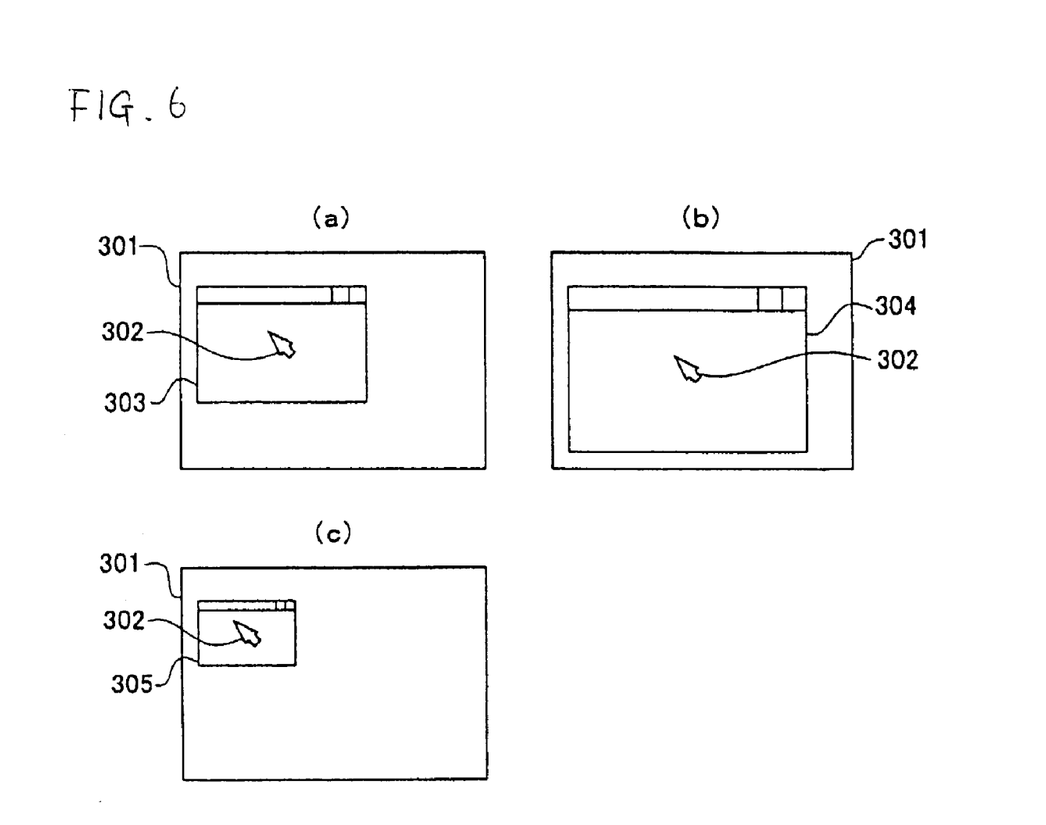
FIG. 6(a) is an elevational view of a display screen with a display operation region in an initial state.
FIG. 6(b) is an elevational view of the display screen with the display operation region of FIG. 6(a) in an enlarged state.
FIG. 6(c) is an elevational view of the display screen with the display operation region of FIG. 6(a) in a reduced state.

As best shown in FIGS. 6(a) through 6(c), the display operation region in display region 301 displayed on display screen 31 may be enlarged or reduced. FIG. 6(a) shows a display operation region 303 in an initial state. FIG. 6(b) shows the display operation region of FIG. 6(a) after it has been enlarged, pursuant to input range information 241 as described above, resulting in display operation region 304. FIG. 6(c) shows the display operation region 303 of FIG. 69a) after it has been reduced, resulting in display operation region 305.

As best shown in FIGS. 6(a)–6(c), region 303 may include a pointer 302, which moves according to operation on digitizer 7. Region 303 may be enlarged, for example, by operating input wheel 61, wherein "wheel (+)" is set in input range changing table 242 to cause enlargement of region 303, resulting in region 304 as shown in FIG. 6(b). Region 303 may also be reduced in size, for example, by operation of input wheel 62 causing "wheel (−)", as set in input range changing table 242, resulting in region 305 as shown in FIG. 6(c).

Figure 7:
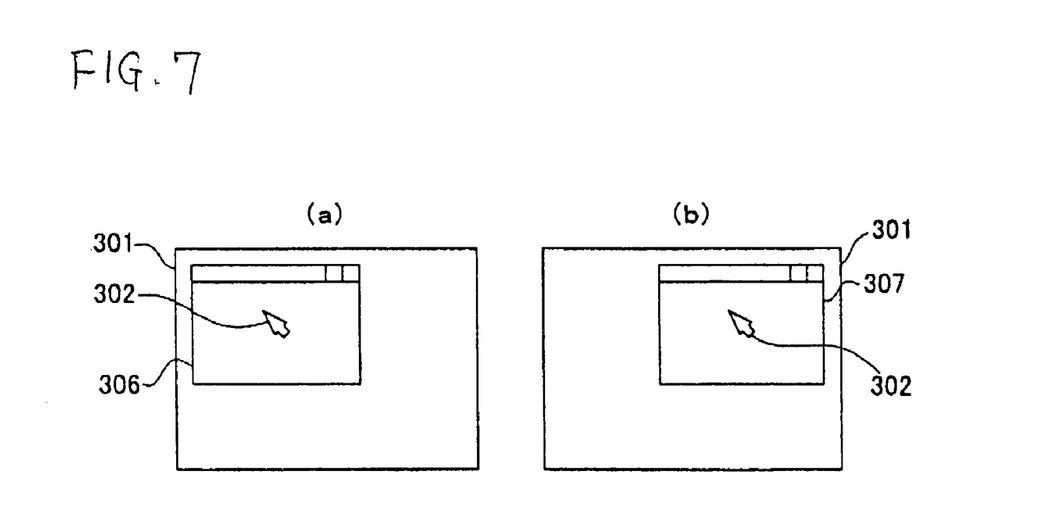
FIG. 7(a) is an elevational view of a display screen with a display operation region in an initial state.
FIG. 7(b) is an elevational view of the display screen with a display operation region of FIG. 7(a) in another state.

The display operation region may also be moved from one position to another position, as shown in FIGS. 7(a)–7(b). The display operation region may be in an initial state 306, as best shown in FIG. 7(a). Region 306 includes pointer 302, which may be moved by operating digitizer 7. Using rotating input ball 62, region 306 may be moved in the X-axis direction, as shown in FIG. 7(b). Specifically, the operation for "ball (horizontal +)" set in input range changing table 242 moves region 306 in the X-axis direction, resulting in region 307 as shown in FIG. 7(b).

Figure 8:
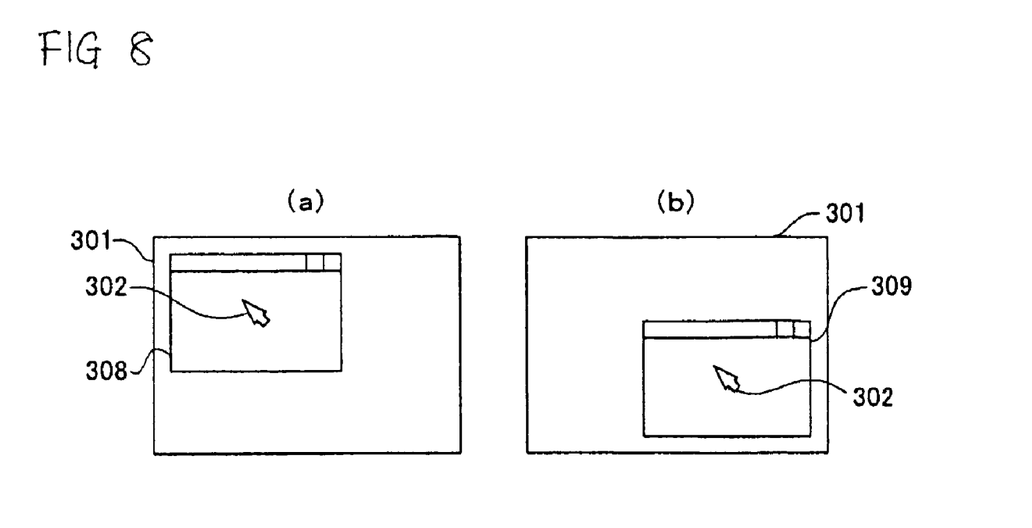
FIG. 8(a) is an elevational view of a display screen with a display operation region in an initial state.
FIG. 8(b) is an elevational view of the display screen with the display operation region of FIG. 8(a) in another state.

Similarly, the display operation region may be moved in the vertical direction relative to display screen 31. As best shown in FIG. 8(a), a display operation region 308 is positioned in an initial state. Region 308 may be moved vertically and horizontally, as best shown in FIG. 8(b) according to operation for "ball (vertical +)" set in input range changing table 242, resulting in region 309. The size of the display operation region may likewise be altered. In addition, the position and size of the display operation region may be changed to a pre-set optimal setting using one of the keys on key portion 63.

Note that the display operation region is described and illustrated as a rectangular region on display screen 31. However, the display operation region may be circular, elliptical, polygonal, or any other desired shape, as long as the region shape corresponds to operating region 71. Furthermore, modifications of the size of the display operation region have been described with set base point coordinates. However, the display operation region may be enlarged or reduced with the pointer displayed within the display operation region as the center of enlargement or reduction, or wherein the center of the display region is the center of enlargement or reduction. Further, digitizer 7 and display 3 may be integrated, so that a display screen of display 3 also functions as an operating region 71 of digitizer 7. Operations of stylus 72 on the screen are detected in the same manner as with operations in operating region 71. Other configurations may be applied depending on user preference and/or program application specifications.

Second Embodiment

Figure 9:
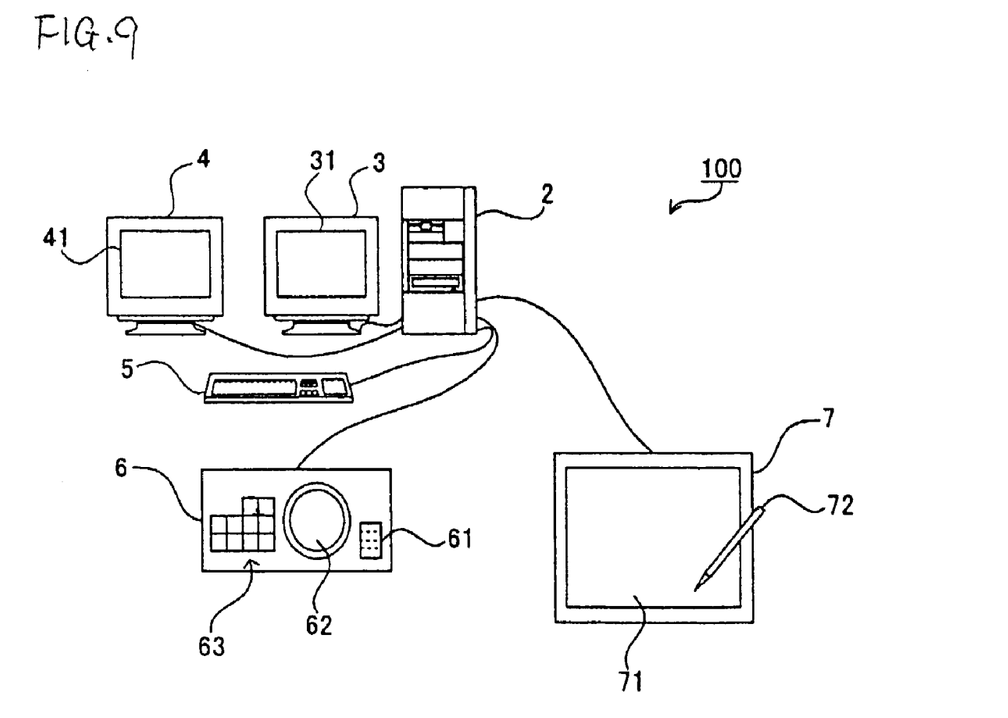
FIG. 9 is a schematic diagram of an input system 100 according to a second embodiment of the present invention.

An input system 100 according to a second embodiment is best shown in FIG. 9. Input system 100 comprises the input system 1 of the first embodiment, in addition to a second display 4, which is also operably associated with computer 2. Thus, input system 100 has a multi-display configuration. All of the components of input system 100 are identical to components described in the first embodiment, except for display 4. Therefore, identical references numerals are used for identical components, and explanations of same will not be repeated hereafter.

Display 4 has a display screen 41 such as a CRT or LCD, etc., and performs various types of display output based on display information output from computer 2. Display 4 is connected to computer 2 via an interface conforming to standards such as D-Sub, BNC, DVI, DFP, etc., and the signals output to display 4 from computer 2 may be either analog signals or digital signals.

Figure 10:
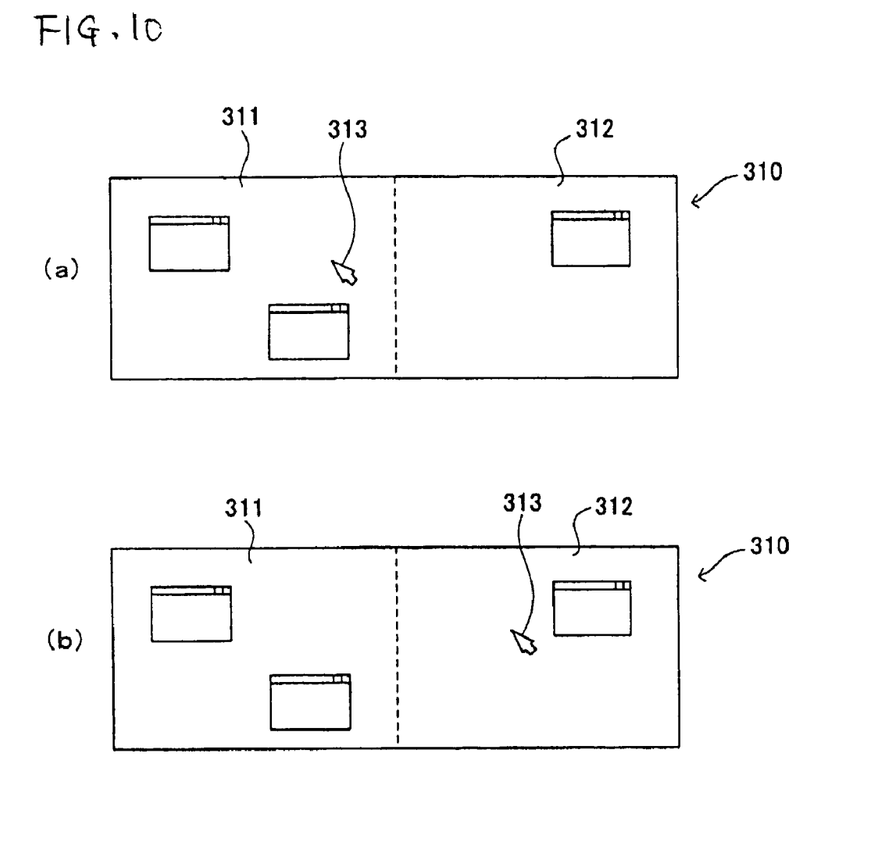
FIG. 10(a) depicts display region 310 divided into a first display region 311 and a second display region 312.
FIG. 10(b) depicts display region 310 of FIG. 10(a) in another orientation.

Input system 100 provides a continuous display region, which may be divided between display screen 31 and the display screen 41. as best shown in FIG. 10(*a*) and 10(*b*). Display region 310 is a display region divided into a first display region 311 and a second display region 312. First display region 311 is displayed on display screen 41, and second display region 312 is displayed on display screen 31. An initial state of first and second display regions 311 and 312 is best shown in FIG. 10(*a*), wherein the display operation region corresponding to operating region 71 of digitizer 7 is first display region 311. Accordingly, pointer 313 is displayed within first display region 311, and corresponds to operations of digitizer 7. The display operation region may be switched to second display region 312 by operation of input device 6, as described above for input system 1, and as shown in FIG. 10(*b*). The display operation region shown in FIG. 10(*b*) is second display region 312. Pointer 313 is now displayed within second display region 312. Therefore, the display operation region in display region 310 may be switched from first display region 311 to second display region 312. Thus, with the multi-display configuration input system 100, the display operation region may be switched between display screen 31 and display screen 41. Thus, use of a wide display area is achieved.

Digitizer 7 may be integrated with one of display 3 or display 4, so that a display screen of one of display 3 or display 4 functions as an operating region 71. Operations of stylus 72 on operating region 71 are detected in the same manner as described above.

Third Embodiment

Figure 11:
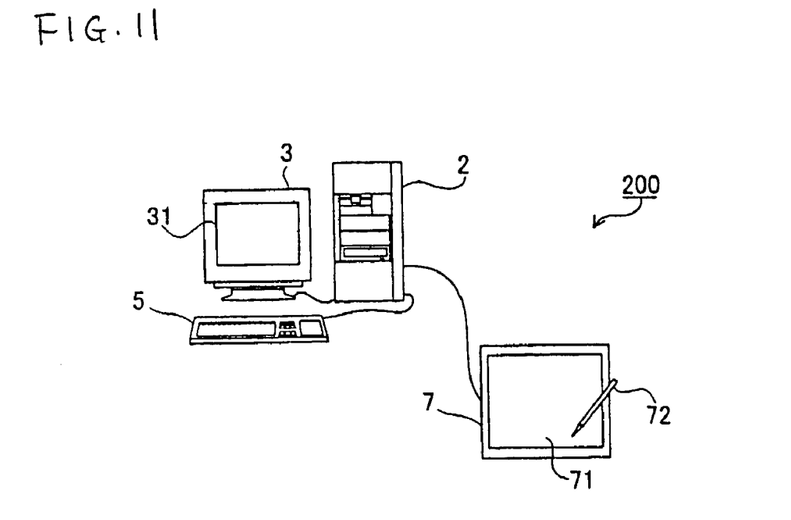
FIG. 11 is a schematic diagram of an input system 200 according to a third embodiment according to the present invention.

An input system 200 according to a third embodiment of the present invention is best shown in FIG. 11. Input system 200 is identical to input system 1 described above, minus input device 6. Therefore, input system 200 only includes input devices 5 and 7. Identical components are denoted with the same reference numerals, and explanations of same will not be repeated hereafter. The display operation region for input system 200 corresponds to operating region 71 of digitizer 7, and is displayed on display screen 31.

Figure 12:
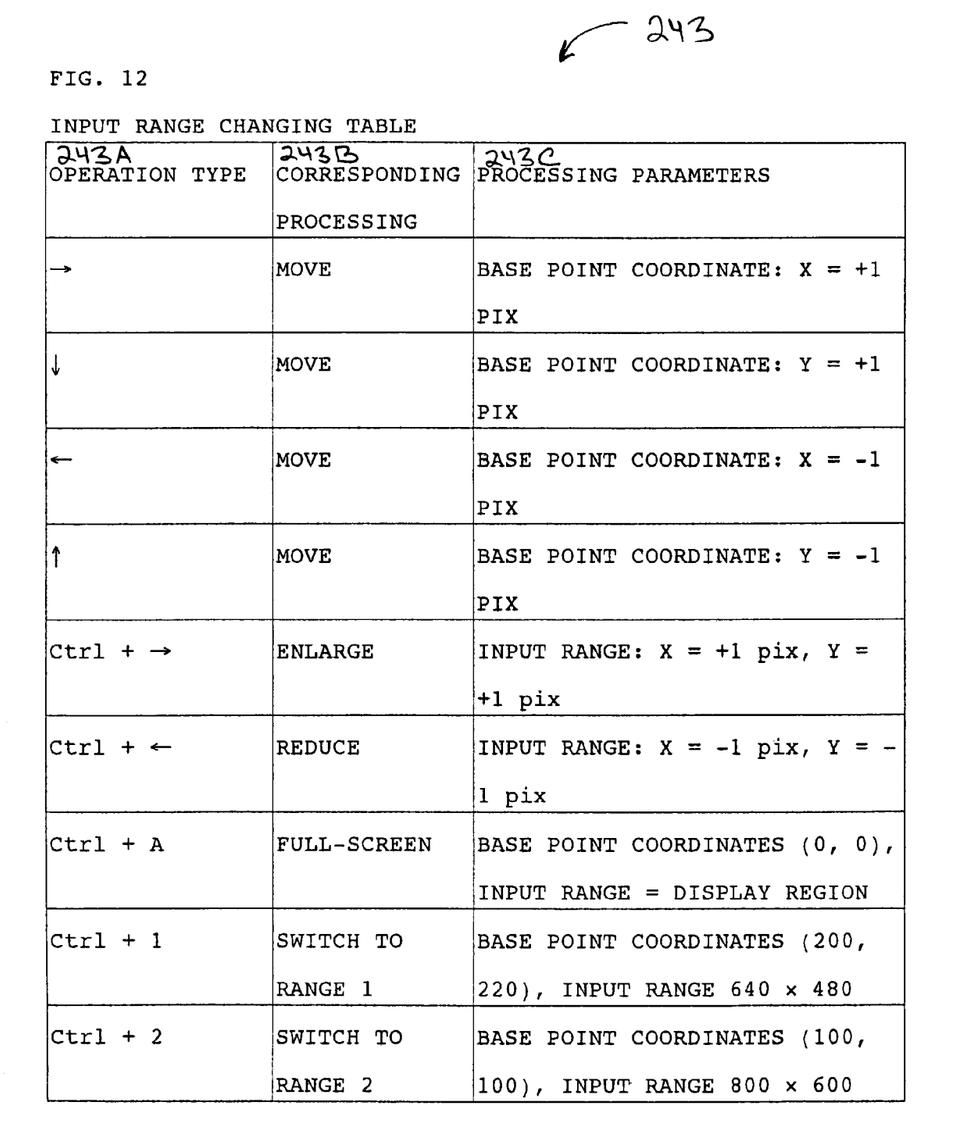
FIG. 12 is a table showing an example of input range changing table 243 of input system 200.

Operations for changing the position and size of the display operation region are performed with keyboard 5. An example of an input range changing table 243 is best shown in FIG. 12. Input range changing table 243 is stored in storage unit 24 of computer 2. Information is set in input range changing table 243 with regard to operation type 243A, corresponding processing 243B, and processing parameters 243C. Operations performed with keyboard 5 are set in operation type 243A. The type of processing to be performed with regard to the display operation region is set in corresponding processing 243B. Specific processing contents are set in processing parameters 243C.

For example, keyboard 5 may include four arrow keys "→", "←", "↑", and "↓". Operation of the arrow keys "→", "←", "↑", and "↓", are each set in operation type 243A in input range changing table 243. "Move" is set in corresponding processing 243B, and corresponds to the operations of these arrow keys "→", "←", "↑", and "↓".

Processing parameters 243C corresponding to operation of arrow key "→" is set to "base point coordinate: X=+1 pix". Accordingly, operation of arrow key "→" changes the X-directional value of base point coordinates 241B in input range information 241 to a value which has been increased by one pixel. Consequently, the display operation region moves one pixel to the right, which is the positive X-axis direction on the screen.

Processing parameters 243C corresponding to operation of arrow key "↓" is set to "base point coordinate: Y=+1 pix". Accordingly, operation of arrow key "↓" changes the Y-directional value of base point coordinates 241B in input range information 241 to a value which has been increased by one pixel. Thus, the display operation region moves one pixel downwards, which is the positive Y-axis direction on the screen.

Similarly, processing parameters 243C corresponding to operation of arrow key "←" is set to "base point coordinate: X=−1 pix". Accordingly, operation of arrow key "←" changes the X-directional value of base point coordinates 241B in input range information 241 to a value which has been decreased by one pixel. Consequently, the display operation region moves −1 pixel in the negative X-axis direction on the screen, which is one pixel to the left.

Processing parameters 243C corresponding to operation of arrow key "↑" is set to "base point coordinate: Y=−1 pix". Accordingly, operation of arrow key "↑" changes the Y-directional value of base point coordinates 241B in input range information 241 to a value which has been decreased by one pixel. Thus, the display operation region moves −1 pixel in the negative Y-axis direction on the screen, which is one pixel upwards.

Therefore, settings in input range changing table 243 provide processing responses to operation of the four arrow keys "→", "←", "↑", and "↓", thereby moving the display operation region.

Keyboard 5 may also include a "Ctrl" key, which may be operated in conjunction with other keys. Simultaneous operation of the "Ctrl" key and arrow keys "→" and "←", the character key "A", or the numeric keys "1" and "2", are each set in operation type 243 in input range changing table 243, as shown in FIG. 12.

"Enlarge" and "reduce" are set in corresponding processing 243B, which corresponds to the simultaneous activation of the "Ctrl" key and the arrow key "→", or arrow key "←", respectively. Therefore, enlarging or reducing the display operation region is achieved.

The processing parameters 243C corresponding to the simultaneous activation of the "Ctrl" key and the arrow key "→" may be set as "input range: X=+1 pix, Y=+1 pix". Increasing the setting in input range 241C in the input range information 241 by one pixel in the X-axis direction and the Y-axis direction is achieved by simultaneously depressing the "Ctrl" key and the arrow key "→". Thus, each time the "Ctrl" key and the arrow key "→" are simultaneously operated, the size of the display operation region is increased in the positive X-axis direction by 1 pixel and in the positive Y-axis direction by 1 pixel.

Similarly, processing parameters 243C corresponding to the simultaneous operation of the "Ctrl" key and the arrow key "←" may be set to "input range: X=−1 pix, Y=−1 pix". Thus, decreasing the setting in input range 241C in input range information 241 by one pixel in the X-axis direction and the Y-axis direction is achieved by simultaneously operating the "Ctrl" key and the arrow key "←". Each time the "Ctrl" key and the arrow key "←" are simultaneously operated, the size of the display operation region is decreased in the negative X-axis direction by 1 pixel and in the negative Y-axis direction by 1 pixel.

Furthermore, corresponding processing 243B corresponding to simultaneous operation of the "Ctrl" key and the character key "A" maybe set to "full-screen". Processing parameters 243C may be set to "base point coordinates (0,0), input range=display region". The base point coordinates 241B in input range information 241 are set to the coordinates (0,0), and input range 241C is set to the same values as the entire display region of the input range information 241, regardless of base point coordinates 241B and input range 241C pre-set in input range information 241 beforehand. Simultaneous activation of the "Ctrl" key and the character key "A" sets the entire display region as the display operation region. In other words, the position and size of the display operation region become the same as that of the entire display region.

Corresponding processing 243B corresponding to simultaneous operation of the "Ctrl" key and the key "1" may be set to "switch to range 1". Processing parameters 243C thereof are set to "base point coordinates (200,220), input range 640×480". Accordingly, upon simultaneous operation of the "Ctrl" key and the key "1" on keyboard 5, base point coordinates 241B in input range information 241 are set to coordinates (200, 220), and input range is set to 640×480 pixels, regardless of base point coordinates 241B and input range 241C pre-set in input range information 241 beforehand. Therefore, simultaneously operation of the "Ctrl" key and the key "1" switches the position and size of the display operation region to values set as a "range 1".

Similarly, corresponding processing 243B corresponding to simultaneous operation of the "Ctrl" key and the numeric key "2" may be set to "switch to range 2". Processing parameters 243C thereof are set to "base point coordinates (100, 100), input range 800×600". Accordingly, upon simultaneous operation of the "Ctrl" key and the numeric key "2" on the keyboard 5, base point coordinates 241B in input range information 241 are set to the coordinates (100, 100) and input range 241C is set to 800×600 pixels, regardless of base point coordinates 241B and input range 241C pre-set in input range information 241 beforehand. Thus, simultaneous operation of the "Ctrl" key and the numeric key "2" switches the position and size of the display operation region to values set as "range 2".

In this way, the display operation region may be easily changed by key operations on keyboard 5. Thus, the position and size of the display operation region are essentially unrestricted, and easily modified. Accordingly, ease-of-use is improved.

It is understood that changing the position or size of the display operation region may be achieved by other input devices, such as a mouse or the like, by changing the setting contents in input range changing table 243. For example, a mouse having a scroll wheel may be used whereby the display operation region is enlarged or reduced by operation of the scroll wheel.

Fourth Embodiment

Figure 13:
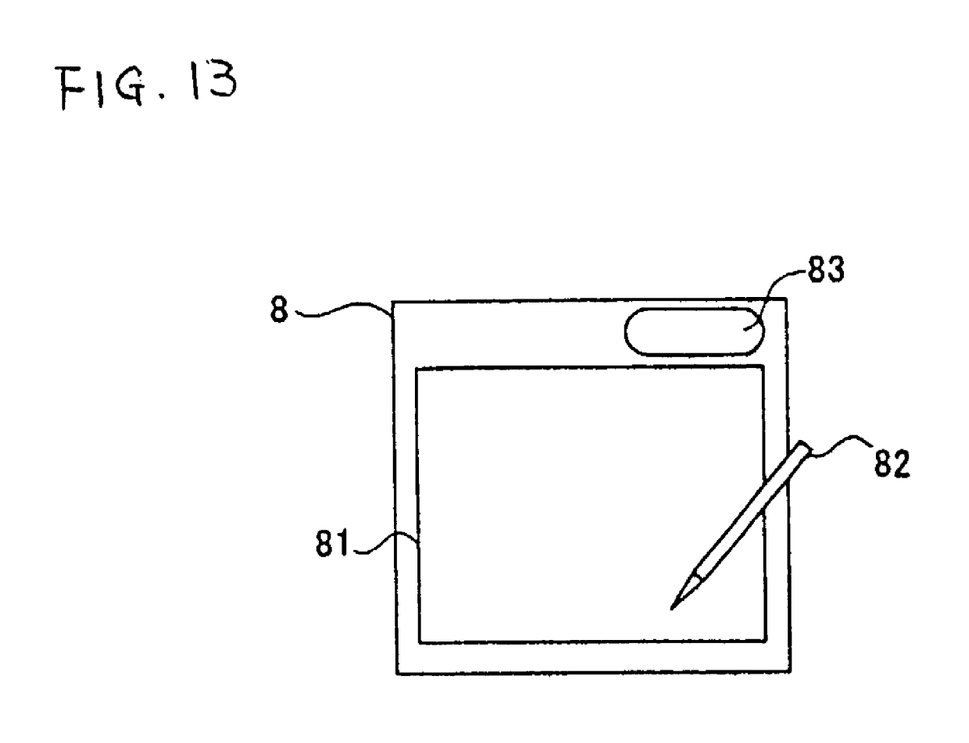
FIG. 13 is a plan view of a digitizer 8 having operating region 81 and operating region 83.

In a fourth embodiment of the present invention, any one of the embodiments for an input system disclosed herein may include as a first input device a digitizer 8, as best shown in FIG. 13. Digitizer 8 may be modified so that it serves as both an input device for performing operations in the display operation region, and as an input device for performing operations relating to changing the display operation region. Digitizer 8 is plate shaped, and includes an operating region 81, an operably associated input pen 82, and an auxiliary operating region 83 in close proximity to operating region 81. Digitizer 8 detects contact and the position of pen 82 on operating region 81, and generates operating signals corresponding to the detected position, as described above. The signals are output to computer 2. Operating region 81 may also be a button, whereby digitizer 8 generates an operating signal upon operation of the button, which is then output to computer 2.

Digitizer 8 further comprises an auxiliary operating region 83. Digitizer 8 detects the position of pen 82 on auxiliary operating region 83, and generates corresponding operating signals different from the signals generated when pen 82 contacts operating region 81, which are output to computer 2. The display operation region may be modified in response to operations detected on auxiliary operating region 83. Thus, the user may perform operations in display operation region using operating region 81, and modify the size and position of display operation region using auxiliary operating region 83, thereby improving the ease-of-use.

As noted above, certain aspects of the disclosed invention have been explained according to the preferred embodiments. However, it will be apparent to one of ordinary skill in the art that various modifications and variations can be made in construction or configuration of the present invention without departing from the scope or spirit of the invention. Thus, it is intended that the present invention cover all modifications and variations of the invention, provided they come within the scope of the following claims and their equivalents.

What is claimed is:

1. An input system comprising:
   a first input device for performing operations in an operation region positioned on a display screen, the display screen operably associated with a computer for executing an application program and for displaying the operation region, said first input device having a digitizer operating area, said digitizer operating area corresponding to the operation region on the display screen, said first input device further comprising an auxiliary operating area for modifying the positioning state of said operation region in response to an operation in said auxiliary operating area, wherein said digitizer operating area and said auxiliary operating area are simultaneously operable;
   a second input device for performing operations differing from operations performed using said digitizer; and
   an input control device for modifying the positioning state of the operation region in response to an operation in said digitizer auxiliary operating area.

2. The input system of claim 1 wherein said first input device is a digitizer and associated stylus, and said second input device comprises at least one of first, second, and third input components in a common housing, said first input component comprising a wheel, said second input component comprising an input ball, and said third input component comprising a key input portion having keys associated with said key input portion.

3. The input system of claim 1, wherein said input control device moves the operation region horizontally relative to the display screen in response to an operation in said auxiliary operating area.

4. The input system of claim 1, wherein said input control device moves the operation region vertically relative to the display screen in response to an operation in said auxiliary operating area.

5. The input system of claim 1, wherein said input control device enlarges the operation region in response to an operation in said auxiliary operating area.

6. The input system of claim 1, wherein said input control device reduces the operation region in response to an operation in said auxiliary operating area.

7. The input system of claim 1, wherein said input control device changes the position of the operation region to one of a plurality of pre-set positions on the display screen in response to an operation in said auxiliary operating area.

8. The input system of claim 1, further comprising a third input device for performing operations differing from operations performed using said first and second input devices.

9. The input system of claim 8, wherein said third input device is a keyboard.

* * * * *